W. C. DAVIDS.
ENGINE VALVE.
APPLICATION FILED JAN. 4, 1919.
1,363,398. Patented Dec. 28, 1920.
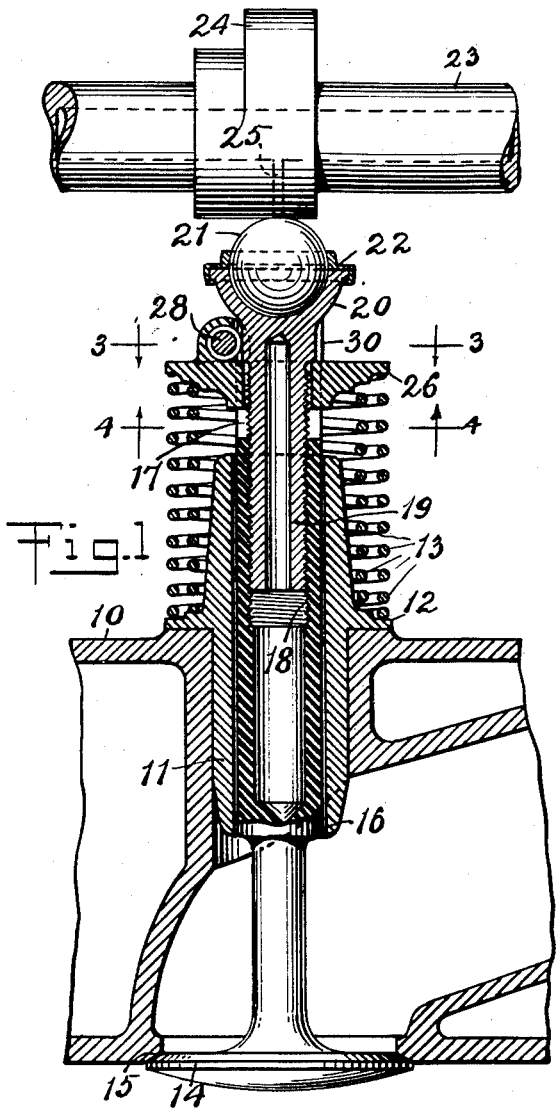
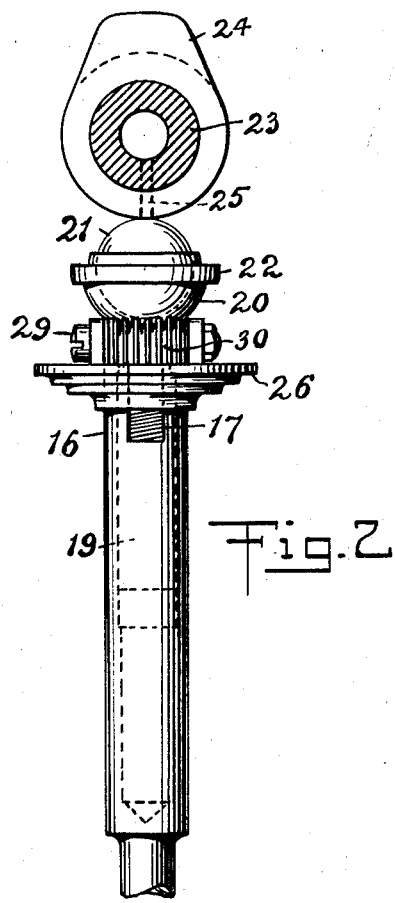
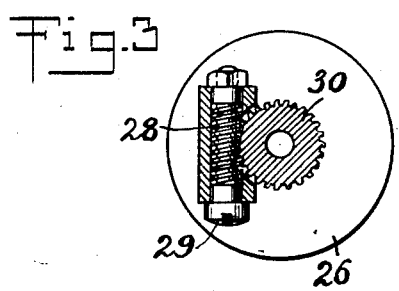
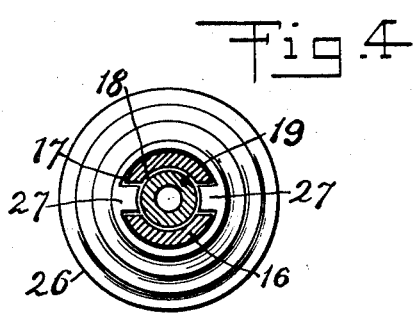
INVENTOR
William C. Davids
BY
Johna Bergstrom
ATTORNEY

UNITED STATES PATENT OFFICE.

WILLIAM C. DAVIDS, OF RUTHERFORD, NEW JERSEY.

ENGINE-VALVE.

1,363,398.   Specification of Letters Patent.   Patented Dec. 28, 1920.

Application filed January 4, 1919. Serial No. 269,553.

*To all whom it may concern:*

Be it known that I, WILLIAM C. DAVIDS, citizen of the United States, and resident of Rutherford, in the county of Bergen and State of New Jersey, have invented certain new and useful Improvements in Engine-Valves, of which the following is a specification.

This invention relates to a puppet valve essentially adapted for an internal combustion engine in which the valve is operated by means of a cam.

The invention is designed to provide a simple and durable construction for reducing noise, friction and wear, also to facilitate the assembling or dismounting of the valve and its parts with the least amount of trouble.

An object of the invention is to provide automatic locking devices mounted on the valve stem for adjusting a ball carrier relative to the cam.

Another object of the invention is to provide a tubular cam shaft for carrying a quantity of oil to lubricate the valve parts, the oil being forced from a small channel in the cam by the centrifugal force of the revolving shaft.

The novel features of the invention are more fully described in the following specification and claims and illustrated in the accompanying drawing in which:

Figure 1 represents a sectional side elevation of an engine valve embodying this invention.

Fig. 2 is a side view showing the upper parts of the ball carrier and cam.

Fig. 3 is a horizontal section taken along the line 3—3 of Fig. 1.

Fig. 4 is a similar view taken along the line 4—4 of Fig. 1.

In the drawing the numeral 10 designates a casing forming a portion of the cylinder of an explosive engine. The casing is provided with an opening suitable for the insertion of a guide 11 having a flange 12 supported on a boss formed at the top of the opening. The lower extension of the guide snugly fits onto the opening and the constant pressure of the coil springs 13 onto the flange will securely hold the guide in a fixed position relative to the casing.

A valve 14 is normally pressed against the seat 15 by the expansion of the coiled springs. The valve includes an enlarged stem 16 slidingly arranged in the said guide, the upper portion being provided with a slot 17 the function of which will hereinafter be described. The enlarged portion of the valve stem is bored to form a partly threaded socket 18 for engagement with a threaded stem 19 constituting the lower part of the ball carrier. The upper end of the stem carries a cage 20 and a hemispherical recess for supporting a steel ball 21, universally movable in said recess. The steel ball is prevented from falling out of the recess by means of a retainer 22 securely fastened to the ball cage.

A cam shaft 23 is arranged directly over the axis of the valve and a cam 24 fixed to the shaft contacts with the ball to actuate the valve as is well known. The cam shaft is tubular or hollow to contain a quantity of oil, and a channel or small hole 25 in the cam connects with the bore of the shaft. The oil is forced from the hole onto the ball by centrifugal action thence over the valve thoroughly lubricating all moving parts of the valve.

The means for adjusting the ball to or from the face of the cam consists of a washer 26 slidingly mounted in the slots 17 located in the top of the valve stem. Keys 27 best seen in Fig. 4, forming an integral part of the washer will prevent it from turning in relation to the valve stem. A worm or screw 28 having a slotted head 29 is rotatively mounted on the washer. The worm normally engages a worm gear or wheel 30 which as shown is milled onto the lower portion of the cage but could be separated and keyed to the same.

As is shown in the drawing the coiled springs 13 are mounted betwen the washer 26 and the flange 12 of the guide. The spring thus tends to slide the washer upward until it strikes onto a shoulder formed on the lower part of the cage. The further expansion of the coiled springs then forces the ball carrying member 19 with the valve and stem 16 upward until the valve is stopped against its seat. The ball will at all times be in contact with the cam by the expansion of the spring.

When it is desired to adjust the ball carrier the worm is turned by a screw driver engaging the slotted head. The slow movement of the worm is imparted to the worm gear so as to raise or lower the ball carrier. This construction gives micrometer adjustment to the ball carrier and at the same time automatically locks it against rotation or displacement.

The method of dismounting the valve is as follows: Press downward on the washer 26 until it hits the lower end of the slot thus disengaging the worm from the worm gear. It is then possible to unscrew the ball carrier to release it from the threaded socket in the upper part of the valve stem.

It will be readily understood that the universal movement of the ball against the impact of the cam reduces the blow, also obviates power and friction losses. The large diameter of the valve stem 16 gives durability to the parts and this in conjunction with the large diameter and shortness of the valve stem guide 11 above the casing makes a very rigid substantial construction eliminating all danger of breakage or distortion.

I claim:

1. The combination with a valve having an interiorly threaded stem, of a carrier with a threaded stem to engage the interior threads, and a screw connected to the carrier for adjusting and automatically locking the carrier.

2. The combination with a valve having an interiorly threaded stem, of a ball carrier having a threaded stem to engage the interior threads, and means including a worm gear and worm connected to the valve stem for rotating the carrier.

3. The combination with a valve having an interiorly threaded stem, of a ball carrier having a threaded stem to engage the interior threads, a worm gear secured to the ball carrier, and a worm connected to the valve stem for engagement with the worm rack to adjust the carrier.

4. The combination with a valve having an interiorly threaded stem, of a ball carrier having a threaded stem to engage the interior threads, a worm gear secured to the ball carrier, and a worm slidingly connected to the valve stem for engagement with the worm gear to adjust the carrier.

5. The combination with a valve having an interiorly threaded stem, of a ball carrier having a threaded stem to engage the interior threads, a worm gear secured to the ball carrier, a washer mounted on the valve stem, and a worm carried by the washer for engagement with the worm gear to adjust the carrier.

6. The combination with a valve having an interiorly threaded stem, of a ball carrier having a threaded stem to engage the interior threads, a worm gear secured to the ball carrier, a washer slidingly mounted on the valve stem, and a worm carried by the washer for engagement with the worm gear to adjust the carrier.

7. In an engine valve the combination with a casing having a guide supported thereon, of a valve having an interiorly threaded stem inserted in the guide, a ball carrier having a threaded stem to engage the interior threads, a worm gear secured to the ball carrier, a washer mounted on the valve stem, and a worm carried by the washer for engagement with the worm gear to adjust the carrier.

Signed at New York in the county of New York and State of New York his 30th day of December A. D. 1918.

WILLIAM C. DAVIDS.

Witnesses:
KATHARINE S. KEANE,
WILLIAM MILLER.